United States Patent [19]

Palmer

[11] Patent Number: 5,290,826
[45] Date of Patent: Mar. 1, 1994

[54] TWO-PART, ULTRA LOW MODULUS SILICONE SEALANT

[75] Inventor: Richard A. Palmer, Midland, Mich.

[73] Assignee: Dow Corning Corporation, Midland, Mich.

[21] Appl. No.: 523,512

[22] Filed: May 15, 1990

[51] Int. Cl.$^5$ ............................................... C08K 9/00
[52] U.S. Cl. ................................. 523/200; 523/205; 524/731; 524/777; 524/773; 524/864
[58] Field of Search ............... 523/200, 205; 524/731, 524/777, 773, 864

[56] References Cited

U.S. PATENT DOCUMENTS

| | | | |
|---|---|---|---|
| 3,441,583 | 7/1969 | Murphy | 260/448.2 |
| 3,776,933 | 4/1973 | Toporcer et al. | 260/448.2 E |
| 3,796,686 | 4/1974 | Golitz et al. | 260/46.5 G |
| 3,817,909 | 1/1974 | Toprcer et al. | 260/375 B |
| 3,862,919 | 2/1975 | Nitzsche et al. | 260/18 S |
| 3,957,704 | 4/1976 | Smith et al. | 260/18 S |
| 3,996,184 | 12/1976 | Klosowski | 260/32.6 R |
| 4,064,096 | 12/1977 | Gibard | 260/37 SB |
| 4,323,489 | 4/1982 | Beers | 524/788 |
| 4,508,888 | 4/1985 | Letoffé et al. | 528/23 |
| 4,532,315 | 7/1985 | Letoffeé et al. | 528/14 |
| 4,889,878 | 12/1989 | Dixon et al. | 524/864 |
| 4,962,151 | 10/1990 | Mellon | 524/860 |
| 4,978,704 | 12/1990 | Perrin | 524/731 |
| 4,978,706 | 12/1990 | Dietlein et al. | 524/864 |
| 5,017,628 | 5/1991 | Dietlein | 523/200 |

FOREIGN PATENT DOCUMENTS 1304362 7/1973 United Kingdom .
1308985 4/1983 United Kingdom .

*Primary Examiner*—John C. Bleutge
*Assistant Examiner*—Karen A. Dean
*Attorney, Agent, or Firm*—Edward C. Elliott; Roger H. Borrousch

[57] ABSTRACT

A two part sealant cures rapidly in deep sections when the two parts are mixed together. A first part consists essentially of a hydroxyl endblocked polydiorganosiloxane, non-reinforcing, non-acidic filler, diacetamidosilane chain extender of the general formula $$(CH_2=CH)(CH_3)Si(\underset{|}{\overset{R'}{N}}-\overset{\overset{O}{\|}}{C}CH_3)_2$$

and aminoxysilicone compound having from 1 to 100 silicone atoms per molecule and from 3 to 10 aminoxy groups per molecule. A second part consists essentially of a hydroxyl endblocked polydiorganosiloxane, non-reinforcing, non-acidic filler, and water. When mixed together, the two parts cure rapidly in deep sections.

10 Claims, No Drawings

TWO-PART, ULTRA LOW MODULUS SILICONE SEALANT

BACKGROUND OF THE INVENTION

1. Field of the Invention

This invention relates to a two part silicone sealant which cures upon mixing of the two parts to give an ultra low modulus elastomeric sealant.

2. Background Information

British Patent Specification 1,308,985, published Mar. 7, 1983, discloses a method of curing room temperature vulcanizing silicone rubber containing acetoxy-silicon bonds, which method adds sodium alumino silicate having adsorbed water. The water from the aluminosilicate causes the silicone rubber to cure even if the composition is not open to atmospheric moisture.

A silicone composition which cures upon exposure to moisture in the air is described in U.S. Pat. No. 3,817,909, issued Jun. 18, 1974. This composition is obtained by mixing a hydroxyl endblocked polydiorganosiloxane, non-acidic, non-reinforcing filler, a difunctional acetamidosilane, and an aminoxysilicon compound.

An organopolysiloxane composition which rapidly hardens to the elastomeric state is disclosed in U.S. Pat. No. 4,508,888, issued Apr. 2, 1985. The composition comprises a polyhydroxylated polysiloxane, a polyacyloxysilane cross-linking agent, and a hardening accelerator comprising water and an alkali or alkaline earth metal phosphate and/or polyphosphate.

SUMMARY OF THE INVENTION

A two-part, ultra-low modulus sealant has been developed which cures rapidly in deep sections when the two parts are mixed. The first part comprises a hydroxyl endblocked polydiorganosiloxane, filler, diacetamidosilane chain extender, and aminoxy functional cross-linker. The second part comprises hydroxyl endblocked polydiorganosiloxane, filler, and water.

DESCRIPTION OF THE INVENTION

This invention is a two-part composition which is stable on storage as two parts and curable at room temperature, upon mixing of an equal weight of the two parts, to yield a silicone elastomer. The composition consists essentially of Part 1, consisting essentially of the product obtained by mixing under anhydrous conditions (A) 100 parts by weight of a hydroxyl radical endblocked polydiorganosiloxane having a viscosity at 25° C. of from 5 to 100 Pa.s and in which the organic groups are selected from the group consisting of methyl, ethyl, vinyl, phenyl, and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals, (B) from 25 to 150 parts by weight of non-acidic, non reinforcing filler having an average particle size of from 1 to 8 micrometers, (C) from 2.5 to 10 parts by weight of a silane of the general formula

in which R' is an organic radical selected from the group consisting of methyl, ethyl, and phenyl, said silane being present in an amount sufficient to provide at least one silane molecule per hydroxyl radical of the polydiorganosiloxane, (D) from 1 to 6 parts by weight of an aminoxysilicone compound having from 1 to 100 silicon atoms per molecule and from 3 to 10 aminoxy groups per molecule, said aminoxy group having a general formula —OX in which X is a monovalent amine radical selected from the group consisting of —NR$_2$ and a heterocyclic amine, R is a monovalent hydrocarbon radical, the —OX group being bonded to silicon through the SiO bond, the remaining valences of the silicon atoms in the aminoxysilicone compound being satisfied by divalent oxygen atoms which link the silicon atoms of the aminoxysilicone compounds having two or more silicon atoms per molecule through silicon-oxygen-silicon bonds and by monovalent hydrocarbon radicals and halogenated monovalent hydrocarbon radicals bonded to the silicon atoms through silicon-carbon bonds, there being an average of at least one monovalent hydrocarbon radical or halogenated monovalent hydrocarbon radical per silicon atom, (E) from 0 to 20 percent by weight of the combination of part 1 and part 2 of a diluent consisting of non-reactive silicone fluid having a viscosity of from 1 to 100 Pa.s at 25° C.; and Part 2, consisting essentially of the product obtained by mixing (F) 100 parts by weight of (A), (G) from 25 to 150 parts by weight of (B), (H) from 0 to 20 percent of the weight of the combination of part 1 and part 2 of (E), and (I) from 0.2 to 4 parts by weight of water, and when equal weights of part 1 and part 2 are combined said silane (C) and said aminoxysilicone compound (D) being present in amounts sufficient to provide a combined weight of at least 5 parts by weight per 100 parts by weight of (A), and said aminoxysilicone compound (D) being present in an amount which is not greater than the weight of silane (C), said composition curing to a non-flowing gel in less than 3 hours at a temperature of 25° C.

The composition of this invention is a two part system, that is the ingredients of the curable composition are made and stored in two parts. The two parts are shelf stable, although part one must be stored in the absence of moisture. When the two parts are combined, they make a composition which cures at room temperature. The composition cures rapidly and completely throughout. The composition is particularly useful in applications where a sealant is needed which is confined or mostly confined and the cure throughout the sealant must be rapid, in the order of 1 or 2 hours. One use for the composition is in sealing joints which are subject to movement during cure. There are applications in which a joint must be sealed, but the joint may move during the normal curing time. Expansion joints in buildings and bridges are an example where such a need arises. The temperature of the structures can change during the day, causing the space in the expansion joint to change fairly rapidly. If a sealant is applied in such a joint, it has been found that the expansion or contraction of the joint during the time at which the sealant is curing will cause the curing sealant to rupture. A normal sealant cures upon exposure to the moisture in the atmosphere, curing from the surface exposed to the air downward into the bulk of the joint. Under such circumstances, if the joint moves during the curing process, the sealant can rupture. The composition of this invention cures throughout after mixing the two parts at a rapid rate and is useful in such situations.

The composition is presented as two parts. The composition has certain requirements as to amounts of ingredients which are used in order to obtain the desired cure rates and cured sealant properties. The two parts of the composition are presented in ratios so that the use of equal weights of the two parts gives the correct amounts of the ingredients. It is possible of course to use different amounts of the ingredients in each of the two parts and different ratios of the two parts to obtain the same final composition. The preferred compositions are claimed for the preferred 1 to 1 ratio of parts 1 and 2 with the understanding that other ratios are also useful and easily determined by one skilled in the art.

The hydroxyl endblocked polydiorganosiloxanes (A) can have a viscosity at 25° C. of from about 5 to 100 Pa.s, preferably from 40 to 60 Pa.s. These polydiorganosiloxanes can be monodispersed, polydispersed, or blends of varying viscosities as long as the average viscosity falls within the limits defined above. The hydroxyl endblocked polydiorganosiloxanes have organic groups selected from methyl, ethyl, vinyl, phenyl and 3.3.3-trifluoropropyl radicals. The organic groups of the polydiorganosiloxane contain no more than 50 percent phenyl or 3,3,3-trifluoropropyl radicals and no more than 10 percent vinyl radicals based upon the total number of radicals in the polydiorganosiloxane. Other monovalent hydrocarbon radicals and halogenated monovalent hydrocarbon radicals in small amounts can be present in the polydiorganosiloxane. The diorganosiloxane units of the hydroxyl endblocked polydiorganosiloxane can be, for example, dimethylsiloxane, diethylsiloxane, ethylmethylsiloxane, diphenylsiloxane, methylphenylsiloxane, methylvinylsiloxane, and 3,3,3-trifluoropropylmethylsiloxane. The term polydiorganosiloxane as used herein does not preclude small amounts of other siloxane units such an monoorganosiloxane units. The hydroxyl endblocked polydiorganosiloxanes are known in the art and can be made by known commercial methods. The preferred hydroxyl endblocked polydiorganosiloxane is hydroxyl endblocked polydimethylsiloxane.

The compositions of this invention contain from 25 to 125 parts by weight of non-acidic, non-reinforcing filler having an average particle size of from 1 to 8 micrometers per 100 parts by weight of hydroxyl endblocked polydiorganosiloxane. The fillers are non-acidic, non-reinforcing filler and include for example, calcium carbonate, ferric oxide, diatomacious earth, alumina, hydrated alumina, titanium dioxide, organic fillers, resins such as silicone resins, crushed quartz, calcium sulfate, and the like. The filler can be treated or untreated. When the filler is present as treated filler, having been treated with a treating agent selected from the group consisting of calcium stearate, stearic acid, salts of stearic acid, and carboxylatepolybutadiene.

The filler is treated with the treating agent by either coating or reacting the filler with the treating agent. Treated fillers are commercially available, such as the calcium stearate treated calcium carbonate filler that is known as CS-11 from Georgia Marble Company of Tate, Ga., and the Kotamite from Cyprus Industrial Minerals Company of Englewood, Colo. The filler is preferably treated because treated filler gives a higher flow to the uncured composition and a lower modulus to the cured composition.

The silane (C) of the general formula

reacts with the hydroxyl endblocked polydiorganosiloxane to give a longer polymer. The longer polymer gives a lower modulus material that is ideal for this type of application. In the formula R' represents an organic radical of the group methyl, ethyl and phenyl. The silanes include, for example, methylvinyldi-(N-methylacetamido)silane, and methylvinyldi-(N-phenylacetamido)silane. A preferred silane (C) is methylvinyldi-(N-methylacetamido)silane. These amidosilanes can be prepared by reacting a chlorosilane with an alkali metal salt of an appropriate N-organoacetamide. This method is further detailed in U.S. Pat. No. 3,776,933, issued Dec. 4, 1973 by Toporcer and Crossan, and hereby incorporated by reference for the preparation of the amidosilanes.

The amidosilanes can be prepared as by the following illustration: mixing a sodium salt of N-methylacetamide with methylvinyldichlorosilane in an inert organic solvent such as toluene, filtering the by-produced sodium chloride from the toluene-product solution, and thereafter removing the toluene by vacuum distillation to obtain the product, methylvinyldi(N-methylacetamido)silane.

The aminoxysilicone compounds (D) are silicon compounds having from 1 to 100 silicon atoms per molecule in which there are from 3 to 10 aminoxy groups per molecule. The aminoxysilicone compounds can be prepared by the method shown in U.S. Pat. No. 3,441,583, issued Apr. 29, 1969, which also illustrates many aminoxysilicone compounds. The aminoxy silicon compounds include silanes and siloxanes. The aminoxy group which is bonded to the silicon atoms through silicon-oxygen bonds can be represented by the general formula —OX wherein X is a monovalent amine radical of the group-$NR_2$ and heterocyclic amine. R represents a monovalent hydrocarbon radical. The —$NR_2$ groups can be represented by N,N-diethylamino, N,N-ethylmethylamino, N,N--dimethylamino, N,N-diisopropylamino, N,N,-dipropylamino, N,N,-dibutylamino, N,N,-dipentylamino, N,N,-dihexylamino N,N,-dibutylamino, N,N-methylpropylamino, N,N,-diphenylamino, and N,N,-methylphenylamino. The heterocyclic amines can be illustrated by ethyleneimino, pyrrolidino, piperidino, and morpholino. Additional aminoxysilicone compounds can be found in U.S. Pat. No. 3,996,184, issued Dec. 7, 1976, which is hereby incorporated by reference to show aminoxysilicone compounds. A preferred aminoxysilicone compound is a copolymer having per molecule an average of two trimethylsiloxane units, five methyl(N,N-diethylaminoxy)siloxane units and three dimethylsiloxane units.

The amount of amidosilane (C) can be from 2.5 to 10 parts by weight per 100 parts by weight of polydiorganosiloxane (A). The most preferred compositions have from 4 to 8 parts by weight. When the amount of amidosilane is less than 2.5 parts, the resulting composition cures to a silicone elastomer with sufficiently higher modulus so that it would no longer be classified as a low modulus silicone elastomer. No advantages are experienced in exceeding 10 parts by weight because slower cures and less desirable physical properties are observed.

The amount of aminoxysilicone compound (D) can be from 1 to 6 parts by weight per 100 parts by weight of hydroxyl endblocked polydiorganosiloxane. The preferred amount of aminoxysilicone compound is dependent to some extent upon the viscosity of the hydroxyl endblocked polydiorganosiloxane. The larger amounts of aminoxysilicone compound are preferably used with the higher viscosity polydiorganosiloxane. If the amount of aminoxysilicone compound exceeds 6 parts, the resulting cured products are high modulus silicone elastomers. The preferred amount of aminoxysilicone compound is from 2 to 4 parts. However, the amount of aminoxysilicone compound regardless of viscosity should not exceed the weight of the amidosilane (C) and the combined weight of amidosilane (C) and aminoxysilicone compound (D) should be at least 5 parts. Amounts of aminoxysilicone compound exceeding the weight of silane (C) result in cured products having high modulus.

The composition of part 1 can be packaged with all the reactive ingredients in one package and stored over extended periods of time under anhydrous condition, such as for three months or more. The composition of part 1 will cure if exposed to moisture. The composition of part 2 will not cure on exposure to moisture so it does not have to be prepared or stored under anhydrous conditions.

The composition of this invention includes from 0 to 20 percent by weight of the total composition of a diluent (E) consisting of non-reactive silicone fluid having a viscosity of from 1 to 100 Pa.s at 25° C.. The non-reactive silicone fluid can be a homopolymer of R"$_2$SiO units where R" is methyl, ethyl, propyl, vinyl, or 3,3,3,trifluoropropyl, and R" can be the same or different in each unit. The end blocking unit of the silicone diluent can be R"$_3$SiO where R" is as described above. The diluent is used to give a lower modulus and a higher elongation than can be achieved without the diluent. If the viscosity of the diluent is too low, the composition does not cure properly, that is, the tack free time becomes excessive. The diluent having a higher viscosity, 12 Pa.s and above for example, appear to give a shorter tack free time than the lower viscosity material. The amount of diluent required is less for the higher viscosity material than for the lower viscosity. The preferred diluent is a trimethylsilyl endblocked polydimethylsiloxane having a viscosity of about 12.5 Pa.s at 25° C.

The compositions are preferably made by mixing the hydroxyl endblocked polydiorganosiloxane and filler to make a homogeneous mixture with the filler well dispersed. A suitable mixture can usually be obtained in one hour using commercial mixers. The resulting mixture is preferably desired and then, in the case of part 1, a mixture of the amidosilane and aminoxysilicone compound is added and mixed with the polymer and filler mixture. This mixing is done under essentially anhydrous conditions. Then the resulting part 1 composition is put into containers for storage under essentially anhydrous conditions. The part 1 compositions are stable; that is they do not cure, if the essentially moisture free conditions are maintained, but will cure to low modulus silicone elastomers when exposed to moisture at room temperature. The diluent can be mixed into the composition in any manner and at any time during the preparation, but it is preferred to add it after the polymer and filler have been mixed as a better filler dispersion takes place. The compositions of the present invention do not require a catalyst to aid in curing the composition and it is observed that many of the conventional curing catalysts used in room temperature vulcanizable silicone elastomer compositions are detrimental to the curing of the compositions.

Part 2 of the composition does not contain a curing system for the polydiorganosiloxane (A), so it is not necessary to have anhydrous mixing or storage conditions. It is preferred however, to store part 2 in a sealed container so that the amount of water present is controlled. If part 2 is stored exposed to the atmosphere, the amount of water present in the system could change, depending upon the temperature and humidity of the atmosphere. Part 2 is prepared by mixing the desired amounts of the ingredients as discussed above for part 1. The amount of water added to part 2 is from 0.2 to 4 parts by weight. This amount is based upon mixing part 2 and part 1 in equal parts by weight. The amount of water present in the final composition would be half of this based upon the total composition. If less than about 0.1 part of water per 100 parts of polydiorganosiloxane (A) is present in the final composition, the composition will not cure properly. The preferred amount of water present in the final composition is from 0.1 to 2 part. It is possible to add more water than this, but it does not accelerate the cure and it will effect the cured properties of the elastomer formed upon curing.

The following examples are included for illustrative purposes only and should not be construed as limiting the invention which is properly set forth in the appended claims. All parts are parts by weight.

COMPARATIVE EXAMPLE

A first part was prepared by mixing 100 parts of hydroxyl endblocked polydimethylsiloxane fluid having a viscosity of about 50 Pa.s at 25° C. and a hydroxyl content of about 0.057 weight percent, 80 parts of calcium stearate treated calcium carbonate filler having an average particle size of about 3 micrometers, and 0.7 parts of carbon black pigment paste. This mixture was desired and then, mixing under anhydrous conditions, 5.9 parts of chain extender consisting of about 80 percent by weight of methylvinyldi(N-methylacetamido)silane with the remaining 20 percent being impurities consisting primarily of methyl-N-methylacatamide, di(methylvinyl-N-acetamido)methylvinylsilane, and xylene; 3.4 parts of aminoxy-functional crosslinker, N,N-diethylaminoxypolysiloxane, of the formula

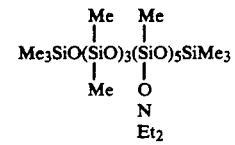

where Me is methyl and Et is ethyl; and 22.5 parts of trimethylsilyl endblocked polydimethylsiloxane having a viscosity of about 12.5 Pa.s at 25° C. were mixed until uniform and then placed into a container for storage under anhydrous conditions.

A second part was prepared by mixing 100 parts of the hydroxyl endblocked polydimethylsiloxane, 79 parts of the calcium carbonate filler, and 22 parts of the polydimethylsiloxane fluid. This second part was then placed in a container for storage until use.

A series of compositions were prepared and tested for cure rate by mixing the above part 1 and part 2 together in various ratios as shown in Table I and placing them into 1 inch deep cups. After 3 hours cure time at 25° C. the cure of the sample was determined with the result as shown in Table I.

TABLE I

| Part 1 parts | Part 2 parts | Chain Extender parts | Crosslinker parts | Cure Condition |
|---|---|---|---|---|
| 1 | 10 | 0.52 | 0.30 | little surface cure* |
| 1 | 7 | 0.72 | 0.41 | no cure* |
| 1 | 5 | 0.96 | 0.55 | gelled to 1 inch depth |
| 1 | 5 | 0.96 | 0.55 | partial gell in depth |
| 1 | 3 | 1.44 | 0.82 | gelled to 1 inch depth |
| 1 | 1 | 2.92 | 1.67 | 3/16 inch surface cure |
| 5 | 1 | 4.92 | 2.82 | ¼ inch surface cure |
| 10 | 1 | 5.39 | 3.08 | <1/16 inch surface cure |

*did not cure due to lack of crosslinker and catalyst

EXAMPLE 1

A series of mixes was prepared in which the ratio of part 1, as above, and part 2, as above, were held constant at 1:1. Water was mixed into part 2 at the rate of 0.5, 1.0, and 2.0 percent, based upon the weight of part 2, to give a total water content in the amount shown in Table II as parts per 100 parts of the polydiorganosiloxane in the final mix. Then the part 1 and part 2 were combined and tested for cure after 1.5 hours in the test cups.

TABLE II

| Water | Cure Condition |
|---|---|
| 0.0 | 3/16 inch surface cure (3 hrs) |
| 0.52 | gelled to 1 inch depth |
| 1.04 | gelled to 1 inch depth |
| 2.07 | gelled to 1 inch depth |

EXAMPLE 2

Another series was prepared in which 1 part of part 2 of Example 1 was mixed with 0, 0.01, 0.1, and 1.0 percent of the final mix of water, then this water-containing part 2 was mixed with 1 part of part 1 of Example 1, giving the total amount of water per 100 parts of polydimethylsiloxane in the composition as shown in Table III. After 2.5 hours cure, the cups were turned to a vertical position to determine if the composition had gelled sufficiently to prevent flow or slump of the material. If the material stayed in place in the cup, it was called self-holding.

TABLE III

| Water | Cure Condition |
|---|---|
| 0.0 | not self-holding |
| 0.02 | not self-holding |
| 0.21 | self-holding |
| 2.1 | self-holding |

That which is claimed is:

1. A two-part composition which is stable on storage as two parts and curable at room temperature, upon mixing of an equal weight of the two parts, to yield a silicone elastomer, the composition consisting essentially of Part 1, consisting essentially of the product obtained by mixing under anhydrous conditions
(A) 100 parts by weight of a hydroxyl radical endblocked polydiorganosiloxane having a viscosity at 25° C. of from 5 to 100 Pa.s and in which the organic groups are selected from the group consisting of methyl, ethyl, vinyl, phenyl, and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals,
(B) from 25 to 150 parts by weight of non-acidic, non reinforcing filler having an average particle size of from 1 to 8 micrometers,
(C) from 2.5 to 10 parts by weight of a silane of the general formula

in which R' is an organic radical selected from the group consisting of methyl, ethyl, and phenyl, said silane being present in an amount sufficient to provide at least one silane molecule per hydroxyl radical of the polydiorganosiloxane,
(D) from 1 to 6 parts by weight of an aminoxysilicone compound having from 1 to 100 silicon atoms per molecule and from 3 to 10 aminoxy groups per molecule, said aminoxy group having a general formula —OX in which X is a monovalent amine radical selected from the group consisting of —NR$_2$ and a heterocyclic amine, R is a monovalent hydrocarbon radical, the —OX group being bonded to silicon through the SiO bond, the remaining valences of the silicon atoms in the aminoxysilicone compound being satisfied by divalent oxygen atoms which link the silicon atoms of the aminoxysilicone compounds having two or more silicon atoms per molecule through silicon-oxygen-silicon bonds and by monovalent hydrocarbon radicals and halogenated monovalent hydrocarbon radicals bonded to the silicon atoms through silicon-carbon bonds, there being an average of at least one monovalent hydrocarbon radical or halogenated monovalent hydrocarbon radical per silicon atom,
(E) from 0 to 20 percent by weight of the combination of part 1 and part 2 of a diluent consisting of non-reactive silicone fluid having a viscosity of from 1 to 100 Pa.s at 20° C., and Part 2, consisting essentially of the product obtained by mixing
(F) 100 parts by weight of (A),
(G) from 25 to 150 parts by weight of (B),
(H) from 0 to 20 percent of the weight of the combination of part 1 and part 2 of (E), and
(I) from 0.2 to 4 parts by weight of water, and when equal weights of part 1 and part 2 are combined said silane (C) and said aminoxysilicone compound (D) being present in amounts sufficient to provide a combined weight of at least 5 parts by weight per 100 parts by weight of (A), and said aminoxysilicone compound (D) being present in an amount which is not greater than the weight of silane (C), said composition curing to a non-flowing gel in less than 3 hours at a temperature of 25° C.

2. The composition of claim 1 in which the hydroxyl endblocked polydiorganosiloxane (A) is a polydimethylsiloxane having a viscosity of from 40 to 60 Pa.s at 25° C.

3. The composition of claim 2 in which filler (B) is treated with a treating agent selected from the group consisting of calcium stearate, stearic acid, salts of stearic acid, and carboxylatepolybutadiene.

4. The composition of claim 1 in which the filler (B) is a calcium stearate treated calcium carbonate.

5. The composition of claim 1 in which the silane (C) is methylvinyldi-(N-methylacetamido)silane.

6. The composition of claim 1 in which the aminoxysilicone compound (D) is a copolymer having per molecule an average of two trimethylsiloxane units, five methyl(N,N-diethylaminoxy)siloxane units and three dimethylsiloxane units.

7. The composition of claim 2 in which filler (B) is a calcium stearate treated calcium carbonate, silane (C) is methylvinyldi-(N-methylacetamido)silane, and aminoxysilicone compound (D) is a copolymer having per molecule an average of two trimethylsiloxane units, five methyl(N,N-diethylaminoxy)siloxane units and three dimethylsiloxane units.

8. The composition of claim 1 in which part 1 consists essentially of 100 parts by weight of polydimethylsiloxane (A), from 60 to 100 parts by weight of calcium stearate treated calcium carbonate filler (B) having an average particle size of about 3 micrometers, from 4 to 8 parts by weight of methylvinyldi-(N-methylacetamido)silane (C), and from 2 to 4 parts by weight of aminoxysilicone compound (D) which is a copolymer having per molecule an average of two trimethylsiloxane units, five methyl(N,N-diethylaminoxy)siloxane units and three dimethylsiloxane units.

9. The composition of claim 1 in which part 2 consists essentially of 100 parts by weight of polydimethylsiloxane (A), from 60 to 100 parts by weight of calcium stearate treated calcium carbonate filler (B) having an average particle size of about 3 micrometers, and from 0.2 to 2 parts of water (I).

10. The cured composition obtained by mixing 1 part by weight of part 1 and 1 part by weight of part 2 of claim 1.

* * * * *